UNITED STATES PATENT OFFICE.

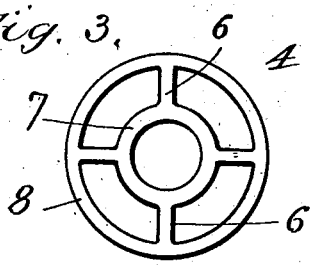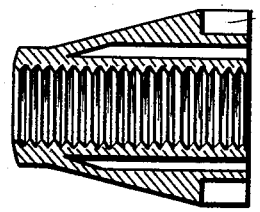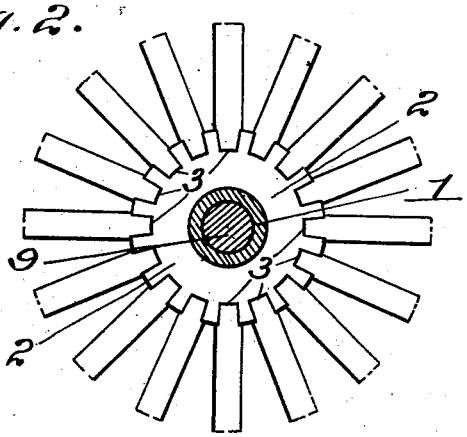

DATHAN MORSE AND NORMAN J. LAMPMAN, OF PITTSTON, PENNSYLVANIA.

VEHICLE-HUB.

SPECIFICATION forming part of Letters Patent No. 715,835, dated December 16, 1902.

Application filed October 10, 1902. Serial No. 126,662. (No model.)

*To all whom it may concern:*

Be it known that we, DATHAN MORSE and NORMAN J. LAMPMAN, citizens of the United States, residing in the city of Pittston, county of Luzerne, State of Pennsylvania, have invented certain new and useful Improvements in Metallic Hubs for Vehicle-Wheels, of which the following is a specification, reference being had therein to the accompanying drawings, in which—

Figure 1 is a vertical sectional view of a part of a vehicle-wheel with our improved hub applied; Fig. 2, a vertical sectional view on the line 2 2 of Fig. 1; Fig. 3, a detail face view of one of the spoke-clamping sections, and Fig. 4 a view showing the spoke-ring formed integral with one of the clamping-sections.

The main object of this invention is to provide a metallic hub formed in sections which may be screwed together to form the complete hub and to clamp the inner ends of the spokes in position.

Another object of the invention is to so construct the hub that the spoke-securing portions may be adjusted longitudinally in order to "dish" the spokes of the wheel either inward or outward at their inner ends, as desired.

A further object of the invention is to so construct the hub that any desired spoke may be readily removed and a new one inserted in its place.

Referring to the various parts by numerals, 1 designates the axle-box, which receives the axle-journal and is threaded on its exterior for its entire length. The spoke-ring 2 is threaded interiorly to permit it to be screwed on the axle-box and is formed with a series of radial recesses or slots 3, said recesses extending inward from the periphery of the spoke-ring a suitable distance. The spoke-ring is equal in thickness to the thickness of the spokes, and the radial recesses are adapted to receive the inner reduced ends of the spokes, these slots or recesses extending laterally entirely through the spoke-ring in order that the inner ends of the spokes may be passed laterally into and out of the said recesses. The inner ends of the spokes are clamped in position in the spoke-ring by means of two spoke-clamping sections 4, which are threaded on the axle-box one on each side of the spoke-ring. These spoke-clamping sections at their inner ends are equal in diameter to the diameter of the spoke-ring, so that when they are screwed inward to place the reduced ends of the spokes are entirely covered by them. As shown in the drawings, these spoke-clamping portions are outwardly tapered and are formed at their outer ends into wrench-receiving heads 5, over which a wrench may be engaged in screwing the said sections in place or in removing them from the axle-box. As shown, these sections are hollow in order to lighten them and are formed with the radial ribs 6 to give them the necessary strength and to connect the inner straight tubular part 7 with the outer tapered shell 8.

The axle-box is retained on the journal 9 of the axle 10 by a nut 11, which is screwed on the threaded outer end of the axle. This nut is smaller in diameter than the bore of the outer spoke-clamping section in order that said section may be adjusted inward or outward over said nut when adjusting the parts of the hub to the desired position. The inner end of the axle-box bears against a shoulder 12 on the axle, this shoulder being also smaller than the bore of the spoke-clamping sections to permit the inner section to be adjusted back and forth over it when adjusting the parts of the hub.

In assembling the parts of the hub if it be desired that the spokes shall all be in the same vertical plane and within the vertical plane of the wheel-rim the spoke-ring is adjusted on the axle-box to bring it within the rim of the wheel, and the spokes are then inserted, their outer ends being first engaged with the wheel-rim or felly and then their inner ends being forced sidewise into the recesses in the spoke-ring. The spoke-clamping sections are then screwed up to place to tightly clamp the spokes in position. Whenever, however, it may be desired to give the spokes a slight dish either inward or outward, the spoke-ring is adjusted on the axle-box so as to be either on the inner side or on the outer side of the wheel-rim, according as it is desired to dish the spokes. The spokes are then placed in position, as before described, and the two clamping-sections screwed up into place. This latter arrangement of the parts is indicated in dotted lines in Fig. 1 of the drawings. Whenever it may become necessary to remove a spoke, the outer spoke-clamping section is first removed, thereby freeing the inner ends of the spokes and permitting any one of the spokes to be removed and a new one to be inserted in its place.

From the foregoing it will be readily seen that by means of this hub repairs may be readily made to the vehicle-wheel, that worn or broken spokes or fellies may be quickly replaced by new ones, and that should the axle-box become worn a new one may be readily inserted.

It will be readily understood that the spoke-clamping sections may be made of any desired form and that, if desired, the spoke-ring may be formed integral with one of the spoke-clamping sections, preferably the inner one, as shown in the drawings.

Having thus described our invention, what we claim as new, and desire to secure by Letters Patent, is—

1. A hub for vehicle-wheels, comprised of a tubular axle-box exteriorly threaded, a spoke-ring threaded on said axle-box and formed with radial recesses at its periphery, and a pair of spoke-clamping devices screwed on the axle-box, one on each side of the spoke-ring.

2. A hub for vehicle-wheels comprised of a tubular axle-box exteriorly threaded, a spoke-ring threaded thereon and provided with radial recesses at its periphery adapted to receive the inner ends of spokes, a pair of spoke-clamping devices threaded on the axle-box one on each side of the spoke-ring and adapted at their inner ends to clamp the spokes their outer ends being formed into wrench-receiving heads.

3. A hub for vehicle-wheels, comprised of a tubular axle-box exteriorly threaded, a spoke-ring threaded thereon and formed with radial recesses at its periphery, a pair of spoke-clamping devices threaded on the axle-box one on each side of the spoke-ring, each of said spoke-clamping sections consisting of the inner tubular part 7, the outer outwardly-tapered part 8, the radial ribs connecting the said parts and the wrench-receiving head formed on the outer end of said section, substantially as described.

4. A hub for vehicle-wheels, comprised of an axle-box, an independent spoke-ring movable longitudinally on said box and adapted to receive the inner ends of the spokes, and a longitudinally-movable clamping device adapted to be adjusted on the axle-box to clamp the ends of the spokes in the spoke-ring.

In testimony whereof we hereunto affix our signatures, in the presence of two witnesses, this 30th day of September, 1902.

DATHAN MORSE.
NORMAN J. LAMPMAN.

Witnesses:
BENJ. A. CROWTHER,
GEORGE DRURY.